(12) United States Patent
Shay

(10) Patent No.: US 7,314,568 B2
(45) Date of Patent: Jan. 1, 2008

(54) WATER CONDITIONING SYSTEM

(76) Inventor: Dale A. Shay, 3006 Cadillac Dr., Rapid City, SD (US) 57703

( * ) Notice: Subject to any disclaimer, the term of this patent is extended or adjusted under 35 U.S.C. 154(b) by 321 days.

(21) Appl. No.: 10/875,941

(22) Filed: Jun. 24, 2004

(65) Prior Publication Data

US 2005/0115906 A1    Jun. 2, 2005

Related U.S. Application Data

(60) Provisional application No. 60/526,152, filed on Dec. 1, 2003.

(51) Int. Cl.
 *C02F 1/42* (2006.01)
 *C02F 1/52* (2006.01)

(52) U.S. Cl. .................. 210/665; 210/670; 210/681; 210/747; 210/902

(58) Field of Classification Search ............... 210/663, 210/670, 900, 681, 724, 747, 902, 665
See application file for complete search history.

(56) References Cited

U.S. PATENT DOCUMENTS

| | | | |
|---|---|---|---|
| 2,938,868 A * | 5/1960 | Carlson et al. ............. 210/662 |
| 3,899,421 A * | 8/1975 | Keilin et al. ............... 210/96.1 |
| 4,237,538 A * | 12/1980 | Le Dall ........................ 700/282 |
| 4,540,715 A * | 9/1985 | Waatti et al. ................. 521/26 |
| 4,810,386 A | 3/1989 | Copa et al. |
| 5,178,768 A | 1/1993 | White, Jr. |
| 5,484,533 A | 1/1996 | Crawford et al. |
| 5,575,901 A | 11/1996 | Hulme et al. |
| 5,578,218 A | 11/1996 | Matsuoka et al. |
| 5,591,326 A | 1/1997 | Shih |
| 5,622,630 A | 4/1997 | Romano |
| 5,667,694 A | 9/1997 | Cody et al. |
| 5,814,224 A | 9/1998 | Khamizov et al. |
| 6,080,319 A | 6/2000 | Alther |
| 6,444,125 B2 | 9/2002 | Han |
| 6,767,468 B1 * | 7/2004 | Metzler et al. ............. 210/662 |
| 6,905,606 B1 * | 6/2005 | Kikuyama et al. .......... 210/724 |

* cited by examiner

*Primary Examiner*—Matthew O. Savage
(74) *Attorney, Agent, or Firm*—Island Patent; F. Scott Tierno

(57) ABSTRACT

A multi-stage water conditioning system is structured for conditioning a flow of influent water passing through the conditioning system by removing one or more cations including sodium, iron, barium, and or ammonia from the influent water, while also possibly adding (as required) calcium and magnesium. Such a conditioning of the influent water results in a reduction in the sodium adsorption ration (SAR) and electrical conductance (EC) of the influent. Versions of the water conditioning system may include a surge and equalization stage, and at least one conditioning stage, which is typically followed by an output finishing stage. Each included conditioning stage provides for a contacting of the influent water with surfaces of a load of molecular filtering material causing a reduction in sodium and other cations as the influent waters flow through the water conditioning system. The system further provides for the inclusion of a regeneration mechanism that is included for regenerating each load of molecular filtering material of each conditioning stage when the molecular filtering material becomes saturated with cations such as sodium, barium, and iron, which have been removed from influent water being conditioned.

11 Claims, 10 Drawing Sheets

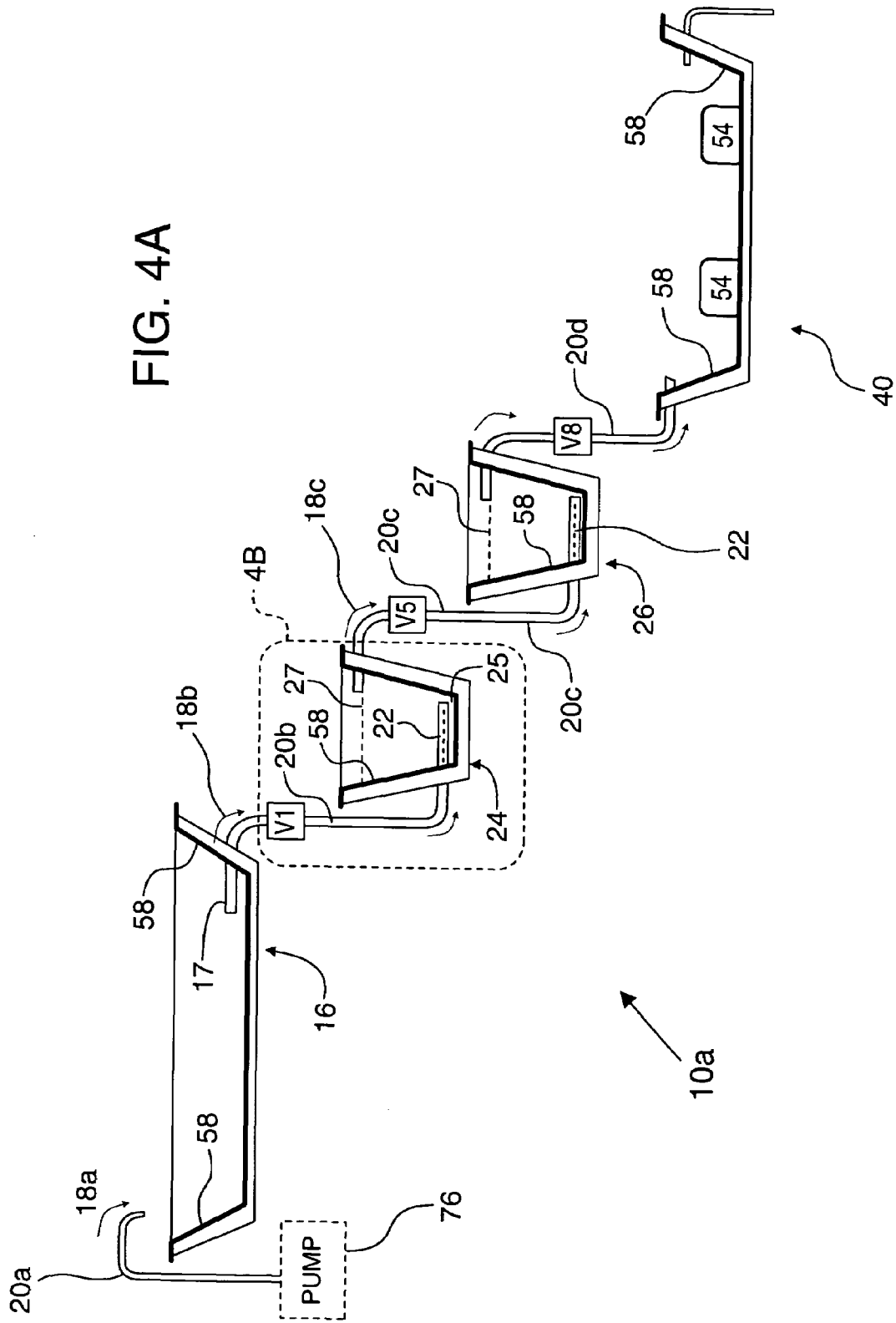

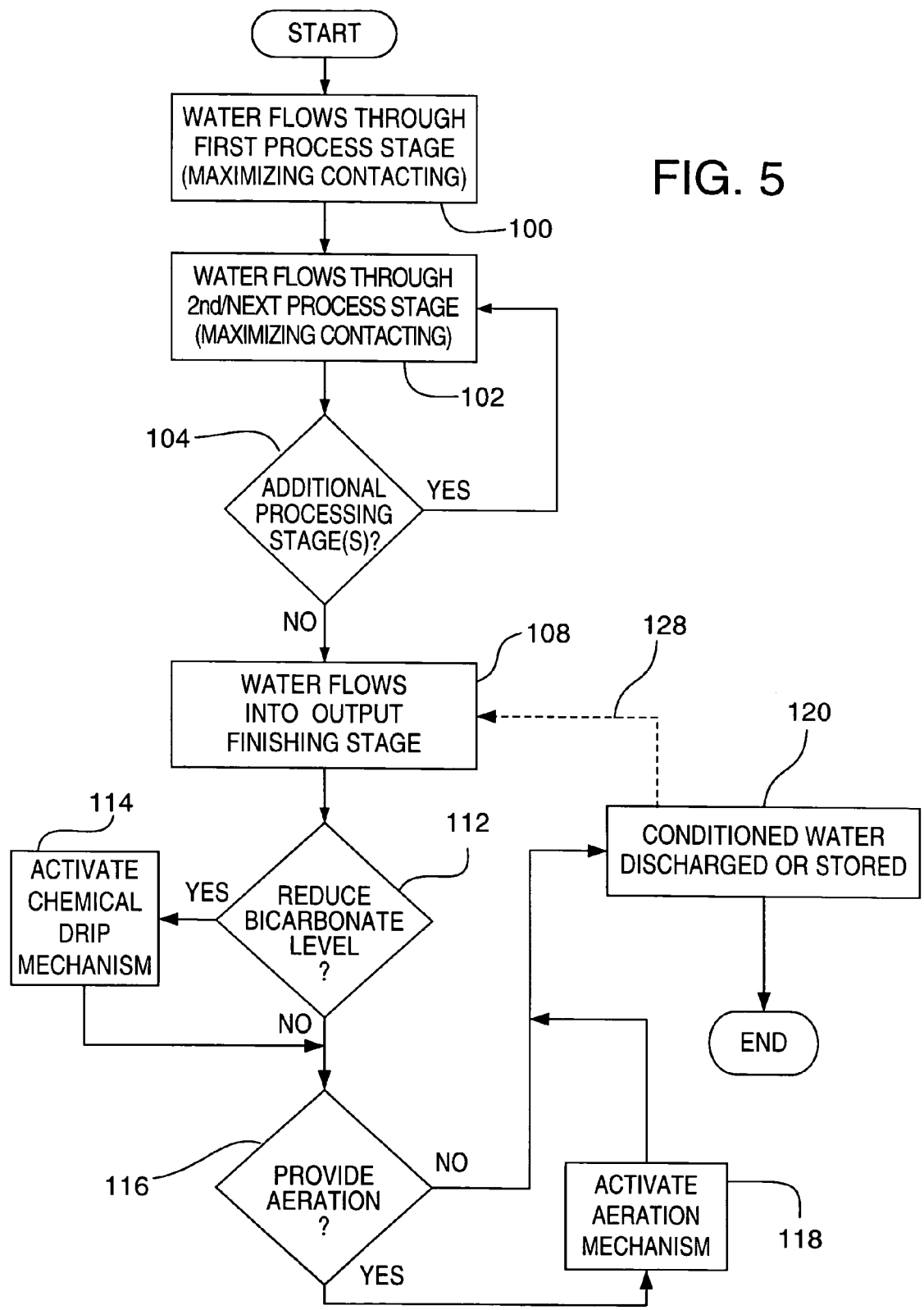

WATER CONDITIONING SYSTEM

CROSS REFERENCE TO RELATED APPLICATION

The subject matter contained herein is related to provisional patent application Ser. No. 60/526,152 filed on Dec. 1, 2003, which is hereby incorporated by reference.

TECHNICAL FIELD

The present invention relates most generally to water processing, conditioning, and/or treatment systems. More particularly, the invention relates to substantially passive means and methods for conditioning a volume of influent water having high concentrations of sodium, soluble salts, and or other cations, in order to produce a volume of conditioned output water that has a significantly reduced salt load (SL), electrical conductance (EC), and sodium adsorption ratio (SAR).

BACKGROUND

A variety of known activities produce as a by-product discharge waters that must be disposed of in an environmentally safe and acceptable fashion. Often these discharge waters must be processed in such a manner wherein they can be utilized for other uses, such as irrigation, or simply released into a proximate stream or river. It may be noted that the discharge waters with which the present invention may be employed are to be broadly defined, and may certainly originate from natural sources, man-made sources, or a combination of both.

An interesting example wherein discharge waters are produced as a side product that may be processed and conditioned by the present invention may be found in coal-bed methane drilling. The United States coal-bed methane (CBM) industry is developing at a rapid pace filling a significant need for methane (natural gas). Very often the pockets of methane are trapped in deep coal seams by water in the coal. Drilling into a coal seam results in a releasing to the surface of the CBM water, freeing the methane for collection and subsequent distribution. The CBM water, which may be additionally termed 'discharge water' or 'influent water', is typically characterized as being high in sodium, soluble salts, and/or other cations. For example, sodium concentrations can often be in excess of 1000 mg/l. In addition, the ratio of sodium to calcium and or magnesium, which is defined as the Sodium Adsorption Ration (SAR) is often in excess of 30 or more. Another measure of interest is electrical conductance (EC), which for CBM discharge waters may exceed 4500 micromhos/l. Each of these levels is considered quite high, and in each case will often prevent a direct and legal releasing of the discharge water into the environment. A simple releasing of these waters is typically not permitted by Federal and or State regulations for several reasons. First, waters with high concentrations of soluble salts are toxic to many plants. Additionally, sodium causes the dispersing of clay, which may cause top soil to be eroded (e.g., by wind and rain), and also reduces water and air permeability of soils.

Accordingly, at the present time industry and regulatory agencies are searching for means and methods for cost-effectively processing and conditioning waters, such as CBM discharge waters. There is clearly a need for new and improved systems and associated methods for conditioning waters such as CBM discharge waters that are high in sodium, soluble salts, and other cations, in a relatively simple and cost effective manner. The conditioned 'output water' that flows from systems employing the present invention will preferably be of such a quality that the water can be used for purposes such as irrigation and live stock watering, or alternately simply released into the environment (e.g., into a proximate stream or river). Importantly, it may be noted that the discharge water to be conditioned in accordance with the present invention will be termed 'influent water', which enters and flows through an embodiment of the present invention for conditioning purposes.

A number of other additional characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, a multi-stage water conditioning system is structured for removing, at minimum, one of sodium and soluble salts from a supply of influent water to be conditioned. In addition, preferred embodiments of water conditioning systems will also condition influent water by removing one or more of iron, barium, ammonia, potassium, while adding (as required) calcium and magnesium.

Preferred embodiments may be structured with a plurality of what may be broadly termed 'conditioning stages' or 'process stages'. For example, a most preferred embodiment of the invention will include at least one conditioning stage configured with a load of a molecular filtering material arranged such that the flowing of the influent water through such a stage causes the reduction of at least one of salt load, sodium concentration, and other cations including one or more of iron and barium. Accordingly, the electrical conductance (EC) of the influent is lowered as the influent flows through each provided volume of molecular filtering material of each process stage.

As will be discussed further hereinafter, each conditioning stage is preferably structured such that influent water enters at a lower location proximate to a bed or bottom region of the conditioning stage and flows upwardly. Upon flowing through the molecular filtering material, and contacting surfaces thereof, the (at least partially conditioned) influent water exits at an upper location. This arrangement, which causes an upflowing of the influent water when flowing through a conditioning stage, has been found to provide the most uniform flow characteristics—thereby causing a maximizing of contacting of the surfaces of the molecular filtering material by the influent water.

In addition, to each conditioning stage structured with a load of molecular filtering material, most preferred embodiments of the invention further include an output finishing stage. The output finishing stage is arranged to receive influent water exiting a conditioning stage to provide for a further reducing of at least one of salt load, sodium concentration, and electrical conductance, while also further reducing the SAR ratio of sodium to other cations such as calcium and magnesium. It is contemplated that one or more mechanisms may be included with the output finishing stage. For example, a chemical drip mechanism, for applying one or more chemicals, may be provided for causing a precipitating of bicarbonates, and possibly other anions and cations. Chemicals of interest for this purpose may include one or more of a selected acid, a calcium containing chemical such as calcium oxide, and a magnesium containing chemical such as magnesium oxide. In addition, automated mechanisms may be included for controlling the drip rate of each included chemical, preferably in a closed loop fashion. Yet other mechanisms may be included with the output finishing stage, for example, aeration and dispersing mechanisms.

Another important aspect of the present invention calls for the inclusion of a regeneration mechanism. A suitable regeneration mechanism provides for the periodic "regenerating" of the load of molecular filtering material in at least one included conditioning stage. Regeneration becomes necessary when the molecular filtering material becomes saturated with sodium, barium, iron, as well as other cations, which have been removed from influent water being conditioned. In most preferred embodiments of the present invention a regeneration mechanism is coupled to each conditioning stage containing a load of molecular filtering material.

Regeneration may be effected by contacting the load of molecular filtering material therein with regeneration chemicals for a selected interval of time, as required. Typically, once the molecular filtering material is contacted with one or more chemicals of the regeneration mechanism, a heavy salt brine is produced and drained. Next, the load of molecular filtering 4 material will most preferably be flushed by way of one to three 'rinse cycles'. The preferred regeneration chemicals and structures will be discussed in greater detail hereinafter.

Another aspect of the present invention includes a surge and equalization stage. For example, the influent water may be first collected and held for a period of time in a surge and equalization pond before flowing into a first conditioning stage. As such, a surge and equalization stage may be included having at least one input coupled to an influent water source, and at least one output coupling the flow of influent water from the surge and equalization pond to the first process stage for contacting the surfaces of the molecular filtering material therein. In the most preferred embodiments of the surge and equalization stage a vessel (e.g., a large earthen pond) may have a sufficient capacity for holding a pre-determined volume of influent water such that the flow of influent water from the surge and equalization pond to the first process stage may be suspended, for a period of time, as required for servicing and regenerating at least one conditioning stage thereof.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 4A illustrates a preferred substantially passive water conditioning system, employing a gravity feed arrangement in accordance with the most preferred embodiments of the invention.

FIG. 5 illustrates a high level operational flow diagram, in a simplified form, for an embodiment of a water conditioning system in accordance with the principles of the present invention.

PARTIAL LIST OF REFERENCE NUMERALS

Figure 1:
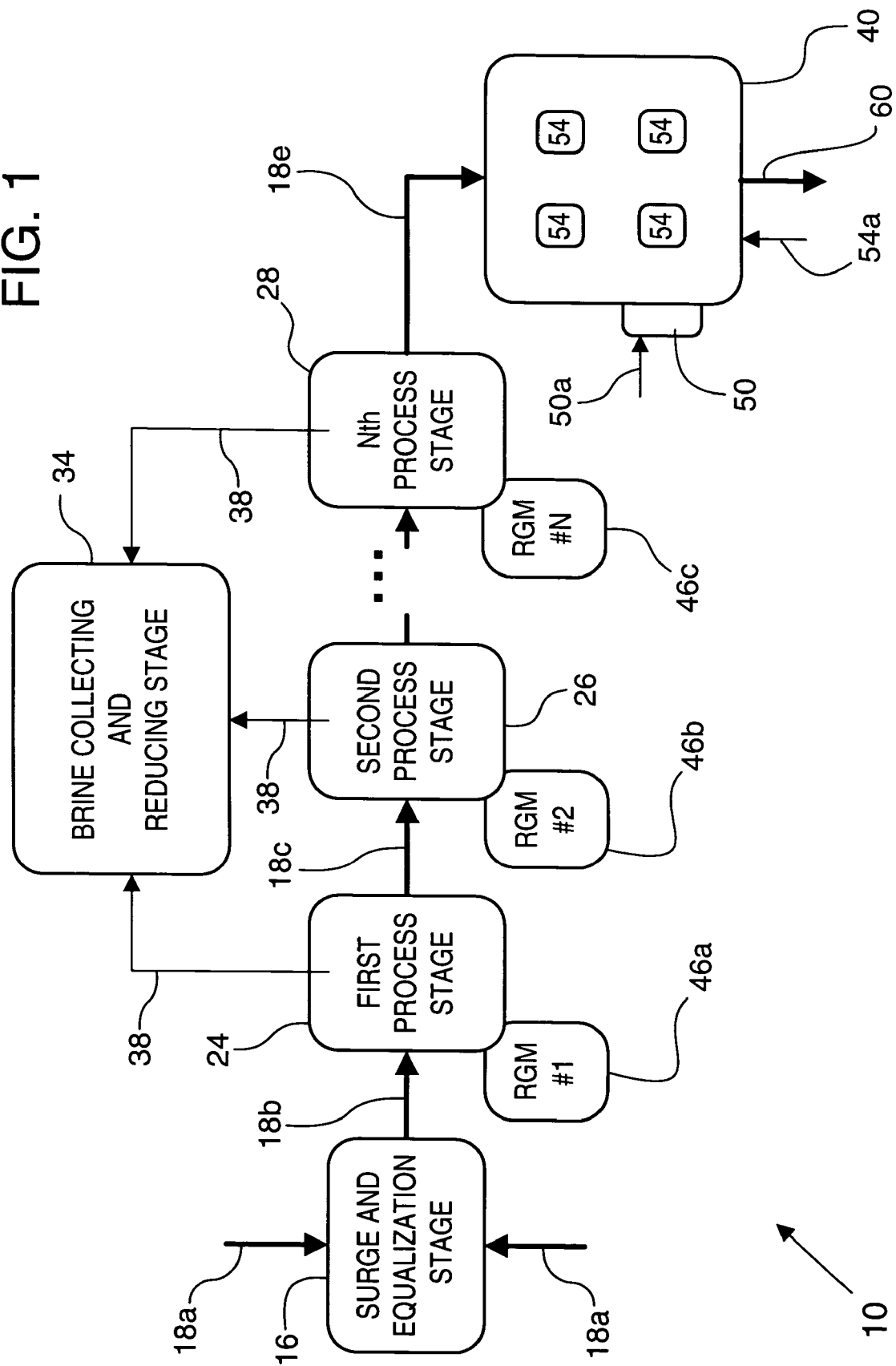
FIG. 1 depicts a high level conceptual block diagram of a water conditioning system in accordance with the present invention.

10,10a,10b—water conditioning apparatus
16—surge and equalization stage
16a—surge and equalization pond
17—outlet pipe or tubing
18a—(source) influent water flow
18b—(system) influent water flow
18c,18e—interstage influent water flow
20—fluidic couplings (generalized)
20a-20c—fluidic couplings (tubings, pipes)
22—perforations (holes)
24—first process stage
24-1—input side or end of 24
24-2—output side or end of 24
24a—first conditioning bed
26—Second process stage
26a—Second conditioning bed
27—high water line
28—perforated manifold assembly
32—input manifold
32a—manifold end cap
34—brine collecting and reducing
36—Nth process stage
38—brine flow (periodic)

40—Output finishing stage or pond
46a-46c—regeneration mechanisms (RGM)
47—chemical storage unit
47a,47b—regeneration chemical storage a
50—chemical drip mechanism or system
54—aeration mechanism
54a—compressed air source
56—evaporation mechanism
58—dispersion mechanism
60—(conditioned) output flow
62—fresh water source
64—molecular filtering material (e.g., zeolite)
66—stone, gravel or washed rock
72—(influent water) flow direction arrows
76—pump or pump module
90—pump and valve module
130,134—fluidic coupling
132—standpipe
136—saturation detection module
V1-V10—valves

DETAILED DESCRIPTION OF EMBODIMENTS OF THE INVENTION

It is important to establish the definition of a number of descriptive terms and expressions that will be used throughout this disclosure. The terms 'conditioning', 'water conditioning', and equivalents, as applied to embodiments of the water conditioning system taught herein, are to be understood to result in an altering of actual levels or relative levels (e.g. ratios) of cations and possibly anions to levels wherein the conditioned influent water may be simply discharged to the environment or employed for irrigation. For example, properly employing preferred embodiments of the invention will result in a reduction in the sodium adsorption ration (SAR) of the conditioned influent water, while also lowering the salt load (SL) and electrical conductance (EC). The term 'molecular filtering material' is to be understood to be any material, typically provided in a granular or powdered form, that can aid in producing the desired conditioning results (e.g., a reduction in SAR, EC, etc.). Preferred molecular filtering materials include one or more available zeolite materials. The terms 'reducing', 'reduced', and 'lowered', are important terms employed when describing the conditioning of influent water flowing through the water conditioning system of the present invention. Specific reductions attained with the invention will vary with a number of parameters, including the type of molecular filtering material employed, the cation and anion types and levels present in the influent water to be conditioned, the flow rate through the system, the number of conditioning and finishing stages utilized, etc. As such, the actual amount of reducing or lowering of levels of cations and anions realized may vary considerably with differing embodiments and constructions of the invention, as well as the actual influent to be conditioned. The terms 'coupled', 'coupled to', etc., are to be understood to mean that two items are either directly connected, or alternately, connected to each other via one or more additional (possibly implied or inherent) structures or components. The terms 'fluidically coupled' and 'fluidic coupling' are to be defined as the necessary conduits, couplings, tubings, pipes, etc., which may be employed to draw and or deliver influent water from a first location to a second location. Other important terms and definitions will be provided, as they are needed, to properly define the present invention and its associated novel characteristics and features.

Referring now to the drawings, FIG. 1 provides a high level functional block diagram of a broadly defined multi-stage water conditioning system 10 in accordance with the invention. As illustrated the water conditioning system 10 may preferably be structured with at least one surge and equalization stage 16 followed by a plurality 'conditioning stages', which may be equivalently termed 'conditioning beds' or 'process stages'. Each process stage of FIG. 1, including first process stage 24, second process stage 26 (when included), down to the Nth process stage 28 (when included), is structured with a load of molecular filtering material such that as the influent water flows through a respective conditioning stage there is a contacting of the influent water with surfaces of the molecular filtering material, causing the desired reduction of cations, including sodium, iron, and or barium by way of an adsorption process. Accordingly, such a contacting of the influent water with the molecular filtering material most preferably results in the lowering of the sodium adsorption ration (SAR), the salt load, and or the electrical conductance (EC) of the influent water being conditioned.

As indicated in FIG. 1, a source of influent water flow 18a may be collected in the surge and equalization stage 16 before flowing into a first, and possibly other, process stages. When included, the surge and equalization stage 16 may provide one or more important functions, including:
a) collecting the influent water and providing sufficient retention time before entering a first/next conditioning stage;
b) ensuring a stable and uniform flow of influent water into the first and subsequent processing and finishing stages of an embodiment; and
c) enabling the flow of influent water entering a first and or subsequent process or conditioning stage to be suspended and stored for a period of time, for example during regenerating and servicing activities.

Each of these functions will now be concisely discussed for completeness. As understood by skilled persons, the above functions of the surge and equalization stage may prove critical in certain applications. For example, when considering the conditioning of influent water in the form of coal-bed methane (CBM) discharge waters, a surge and equalization stage is typically required as the flow of CBM waters is not constant and predicable, and can vary from a few gallons a minute to several hundred gallons a minute, or more. As such, surge control may be an important consideration. In addition, influent waters such as CBM discharge waters often require a period of time for equalization of chemical quality (e.g., homogeneity). As such, a minimal retention time of the influent waters within the surge and equalization stage before flowing into a first conditioning stage is an important consideration. Finally, preferred embodiments of the surge and equalization stage 16 are to be provided with a sufficient capacity to be able to store a flow of influent waters 18a for a period of time during which regeneration of one or more volumes of molecular filtering material of a process stage may be effected. As indicated hereinabove, the regeneration of molecular filtering material is required when the molecular filtering material becomes saturated with cations that have been removed from influent water being conditioned by contacting the molecular filtering material.

As illustrated in FIG. 1, influent water 18b passes from the surge and equalization stage 16 and into an inlet of a first process stage 24 as influent water flow 18b. As the influent water flow 18b enters and passes through the first process stage 24, the contacting of molecular filtering material occurs resulting in a removing and lowering of a number of cations present in the influent water. A more detailed discussion of the flowing of the influent water and conditioning realized by a process or conditioning stage will be provided when referring to FIGS. 4A, 4B, and 4C.

As further indicated in FIG. 1, preferred embodiments of the water conditioning system 10 of the present invention include one or more regeneration mechanisms, such as regeneration mechanisms 46a, 46b, and 46c. Each regeneration mechanism is included for periodically regenerating a load of the molecular filtering material in at least one included process stage such as first process stage 24 and second process stage 26. The regenerating of a load of molecular filtering material is necessitated when significant numbers of the available crystalline exchange sites of the molecular filtering material become saturated with cations that have been removed from influent water being conditioned.

As will be discussed hereinafter, preferred regeneration methods typically require a suspending of the flowing of influent water through the conditioning or process stage to be regenerated. Once regeneration has been completed the regenerated process or conditioning stage is again available for effectively removing cations and lowering the SAR and EC levels of influent water flowing through the regenerated stage.

As shown in FIG. 1, the regeneration of a process stage, such as process stage 24, will produce a heavy salt brine. As indicated, the regeneration of each process stage produces a flow 38 of salt brine, which is typically pumped out of a process stage to the brine collecting and reducing stage 34.

Turning again to FIG. 1, an output finishing stage 40 may preferably be included for finishing and polishing the (at least partially) conditioned influent water before exiting the system as conditioned water 60. It is to be understood that the output finishing stage 40, and provided functions and mechanisms thereof may vary with the specific influent water to be conditioned. For example, when conditioning CBM influent water the output finishing stage may include a chemical drip mechanism 50, having a suitable supply of one or more chemicals 50a thereto, for applying to the influent water flow 18e entering the output finishing stage 40. In addition, the output finishing stage 40 may include one or more aeration mechanisms 54 having coupled thereto a source of compressed air 54a.

Figure 2:
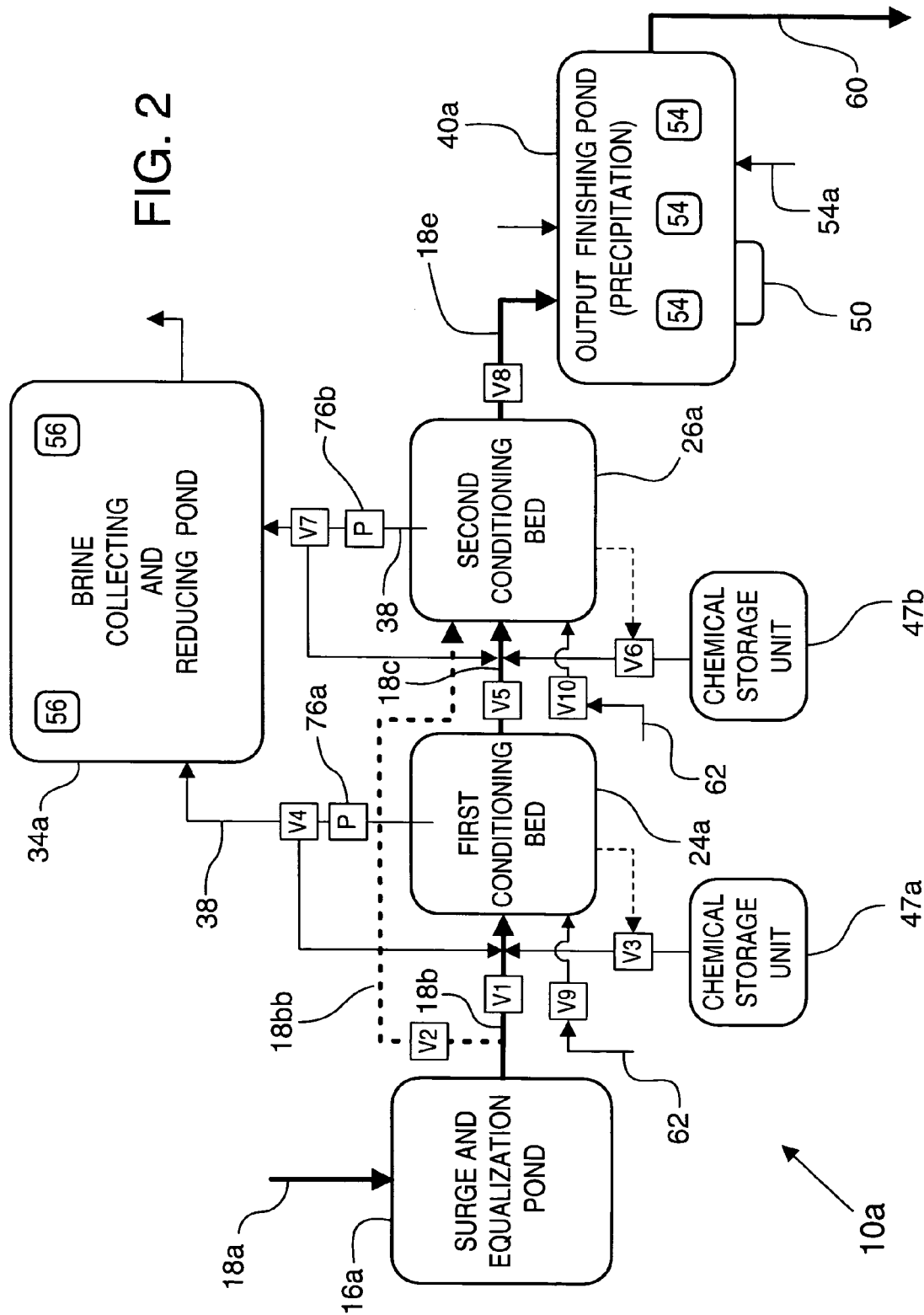
FIG. 2 is a functional block diagram of a first preferred embodiment of the invention preferably employing a plurality of zeolite conditioning beds for contacting influent waters flowing therethrough for conditioning purposes.

Referring now to FIG. 2, a most preferred embodiment of a water conditioning system 10a of the invention is illustrated. As shown, this embodiment includes a surge and equalization pond 16a, a first conditioning bed 24a, a second conditioning bed 26a, and an output finishing pond 40a. As can be clearly seen in FIG. 2, the flow 18a of influent water enters the system via the surge and equalization pond 16a. A controlled and uniform flow 18b of influent water is coupled to the inlet of the first conditioning bed 24a. As influent water flows into and through the first conditioning bed 24a a contacting of the load of molecular filtering material of the first conditioning bed 24 occurs. This results in adsorption and reducing of the level of cations present in the flowing influent water. As the influent water 18b continues to flow into the first conditioning bed 24a, a flow 18c of influent water passes from an output of the first conditioning bed 24a into the second conditioning bed 26a. In like manner to the first conditioning bed 24a, the influent water passes through and is conditioned via contacting surfaces of the molecular filtering material of the second conditioning bed 26a.

After flowing through each conditioning bed included with an embodiment of the invention, an influent water flow 18e flows from an output of the last conditioning stage, which for the embodiment of FIG. 2 is the second conditioning bed 26a, into the output finishing pond 40a. As with the generalized embodiment 10 of FIG. 1, the output finishing stage 40a may be configured having aeration mechanisms 54, with each coupled thereto a source of compressed air 54a, and a chemical drip mechanism 50, as required. After finishing and polishing of the influent water in the output finishing pond 40a, an output flow 60 of the now conditioned influent water exits from the water conditioning system. The output flow 60 of discharged water may be fed to a nearby stream or river, or alternately possibly used for irrigation, live stock watering, etc.

Returning again to FIG. 2, an arrangement of a plurality of valves are included for controlling the conditioning and regenerating activities of the invention. Each valve is preferably provided having a free flowing construction such as a gate valve or a ball valve. It is important to understand that the plurality of valves depicted in FIG. 2 is but one of a number of valving arrangements that are providable by skilled persons. In addition, each valve may be provided as a type that is mechanically activated by hand, or alternately selectively activated in an automated (e.g., on-off) fashion from a central or remote location. A brief description of the valves of FIG. 2 is as follows:

a) Valve V1 enables the flow 18b of influent water entering an inlet of the process stage to be suspended, as required, for regeneration and repair/service activities;

b) Valve V2, when included enables a flow 18bb of influent water to be established (typically with valve V1 closed) so that one or more process stages, such as first conditioning bed 24a, may be bypassed during conditioning activities;

c) Valves V3 and V6 are included for controlling the flow of regeneration chemicals from the chemical storage units 47a and 47b, respectively, for regeneration of a respective load of molecular filtering material contained in the first conditioning bed 24a and second conditioning bed 26a;

d) Valves V4 and V7 are each depicted as multi-port valves that are employed during regeneration activities (as will be discussed when referring to FIG. 6.); and e) Valve V5 enables the flow 18c of influent water entering an inlet of the second conditioning bed 26a to be suspended, as required, for regeneration and repair/service activities;

f) Valve V8, when included, enables the flow 18e of influent water from the second conditioning bed 26a into the output finishing pond 40a to be adjusted, reduced, or shut off.

g) Valves V9 and V10 are typically included for enabling a source of fresh water 62 to be fed into a conditioning bed during regeneration and or rinsing activities.

Figure 6:
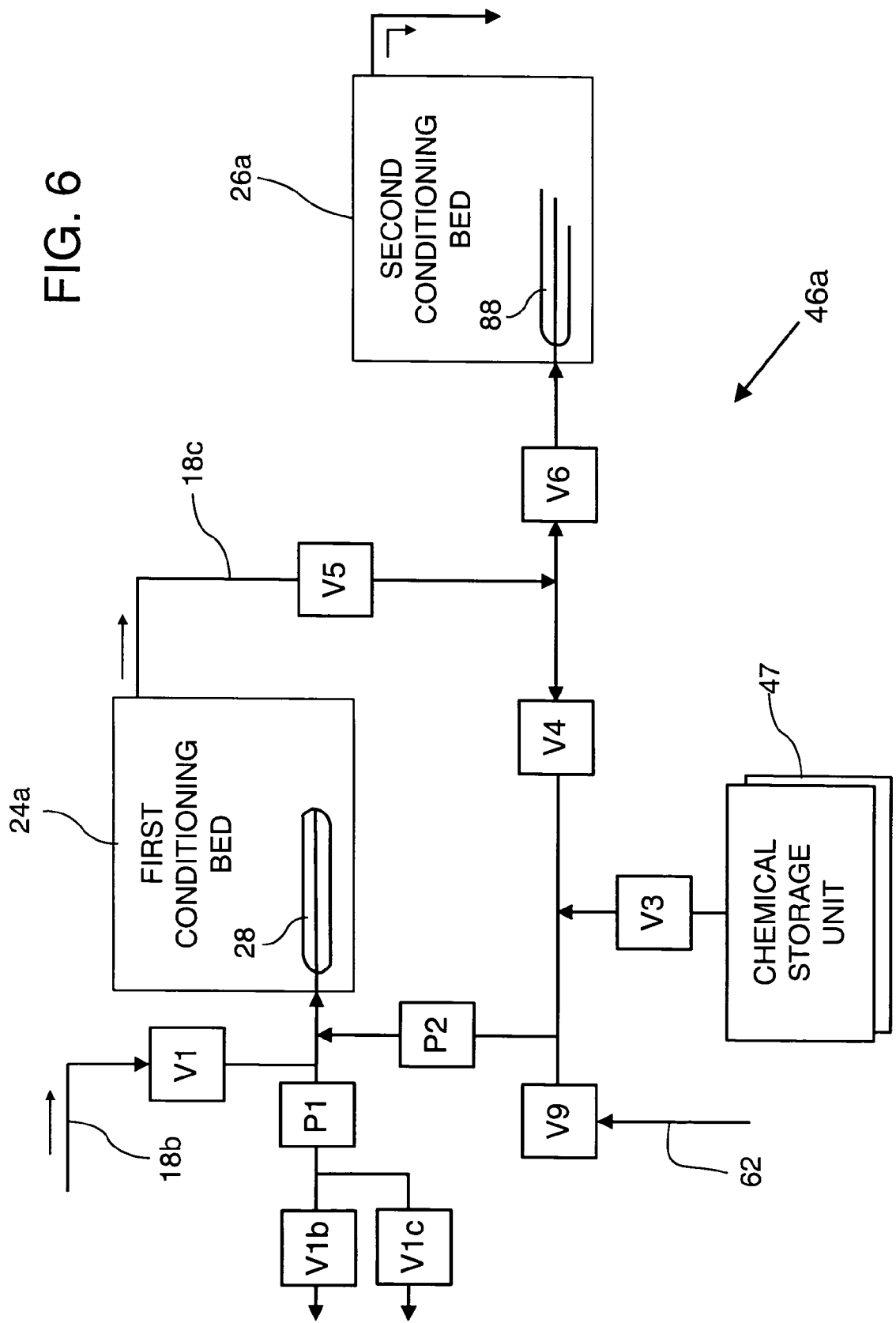
FIG. 6 provides a high level schematic diagram of an arrangement of components, including a plurality of valves and at least one pump, structured for selectively conditioning a volume of influent water flowing through a load of molecular filtering material of a first conditioning bed, or alternately regenerating the load of molecular filtering material once it becomes saturated with sodium, soluble salts, and or other cations and anions.
Figure 7A:
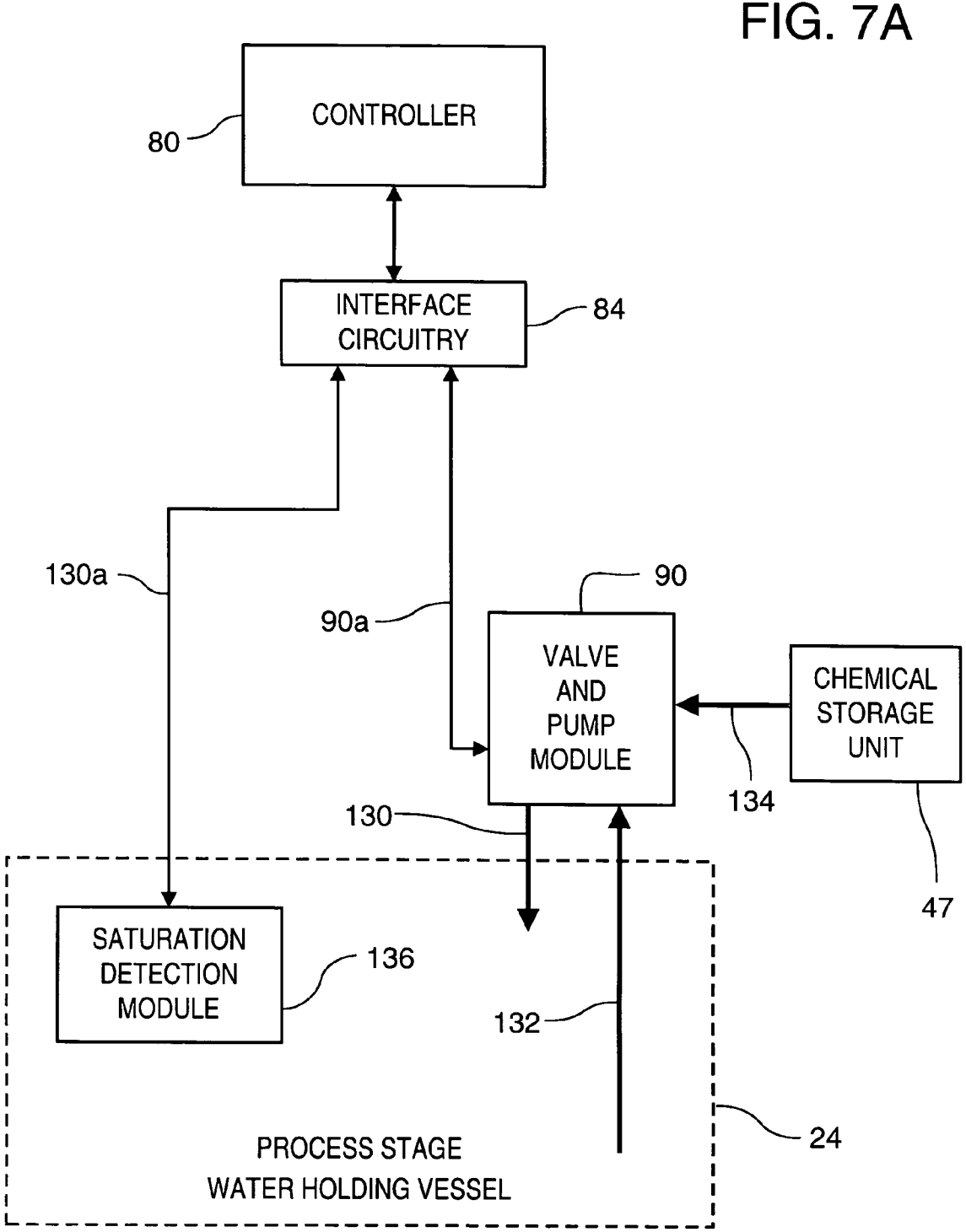
FIG. 7A is a high level schematic of a controller based automated embodiment of the invention for preferably automatically controlling the regenerating of a water conditioning bed containing a load of molecular filtering material.
Figure 7B:
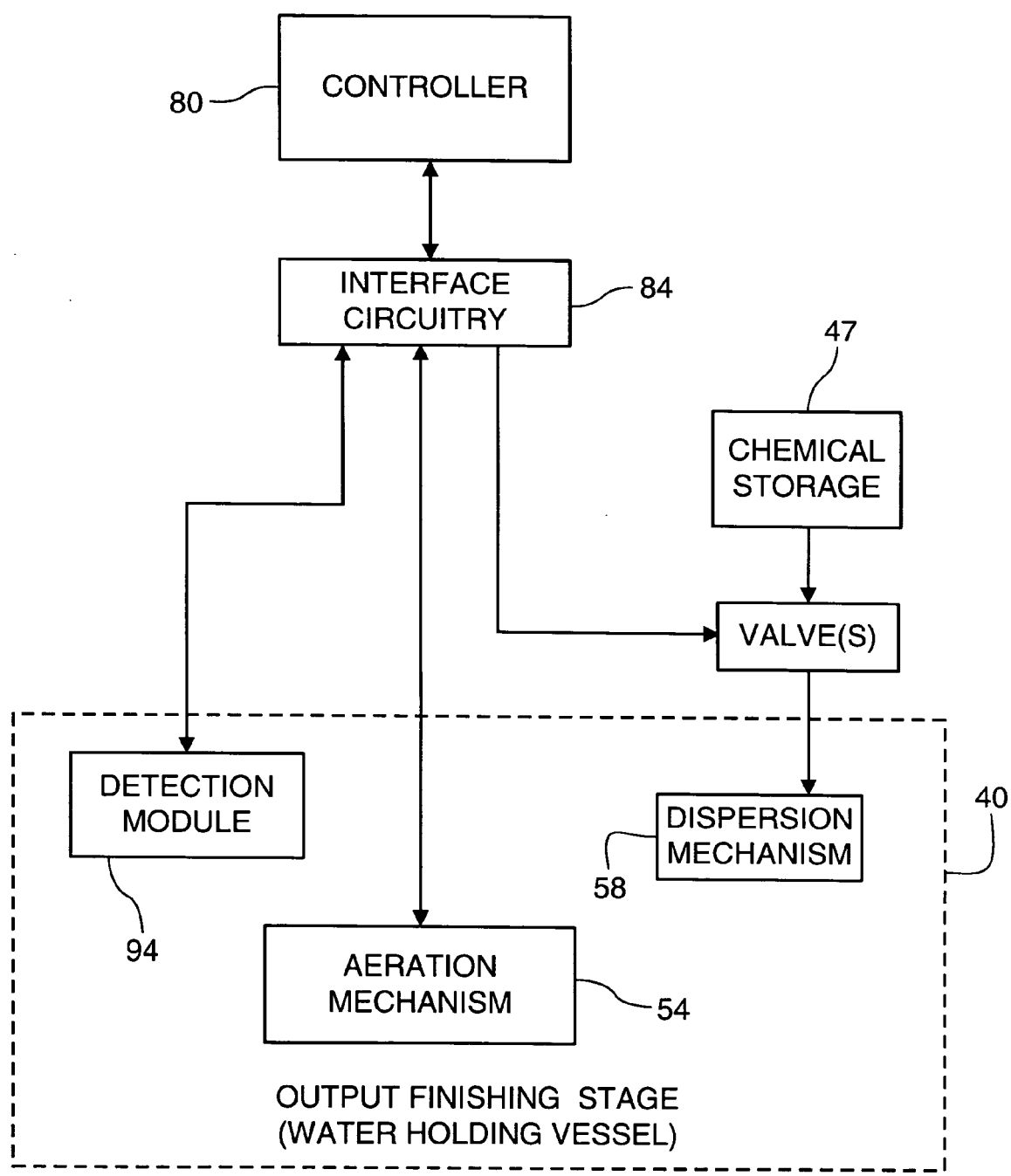
FIG. 7B depicts a controller based embodiment of an automated system for controlling mechanisms of an output finishing stage/pond of the invention.

The use of each of these valves, as well as other valve arrangements providable by skilled person, will more completely discussed when referring to FIGS. 6, 7A, and 7B. The inclusion of pumps, such as pumps 76a and 76b of FIG. 2, enable a dewatering of a conditioning bed. As such, a respective pump, such as pump 76a, may be directly coupled to a suitable fluidic coupling, such an included stand pipe, for dewatering of the conditioning bed. Alternate valve and pump arrangements will be discussed hereinafter.

When considering water conditioning systems that are of such a scale wherein hundreds of gallons of influent water can be conditioned per minute, embodiments such as that of FIG. 2 may be structured with a surge and equalization pond 16a, each conditioning bed 24a and 26a, the output finishing pond 40a, and the brine collecting and reducing pond 34a, provided as earthen ponds. When provided as earthen ponds, each respective pond may preferably be constructed as follows:

a) surge and equalization pond 16a is preferably provided with 2H:1V side slopes, and having a sufficient capacity for holding and storing incoming influent waters for 12 to 24 hours, or more;

b) the conditioning beds are preferably configured having steep walls (e.g., 1H:1V side slopes, or steeper) and having a deep construction for improved contacting and retention characteristics;

c) an output finishing pond 40a is preferably constructed having sideslopes of 2H:1V and a required capacity providing a sufficient retention time (e.g., for finishing activities possibly including precipitation and settling of bicarbonates) before the conditioned influent water flows out of the output finishing stage.

In addition, to the above listed preferences, each earthen constructed stage/pond is most preferably lined with at least one of a high density polyethylene (HDPE) or polyproylene sheet/liner material. As skilled individuals will appreciate, a liner of such material having a thickness of 25 to 50 mils will provide a low cost, long life water conditioning system in accordance with the invention. For example, when considering a most preferred embodiment of the invention, such as depicted in FIG. 4A, a liner 58 may be provided for each of the surge and equalization stage 16, the first and second process stages 24 and 26, and the output finishing stage 40.

Although earthen constructed ponds and vessels may be most cost effective for large water conditioning systems of the invention, containers and vessels employed for each stage may certainly be constructed of a variety of suitable materials including plastic, steel, and or concrete.

Figure 3:
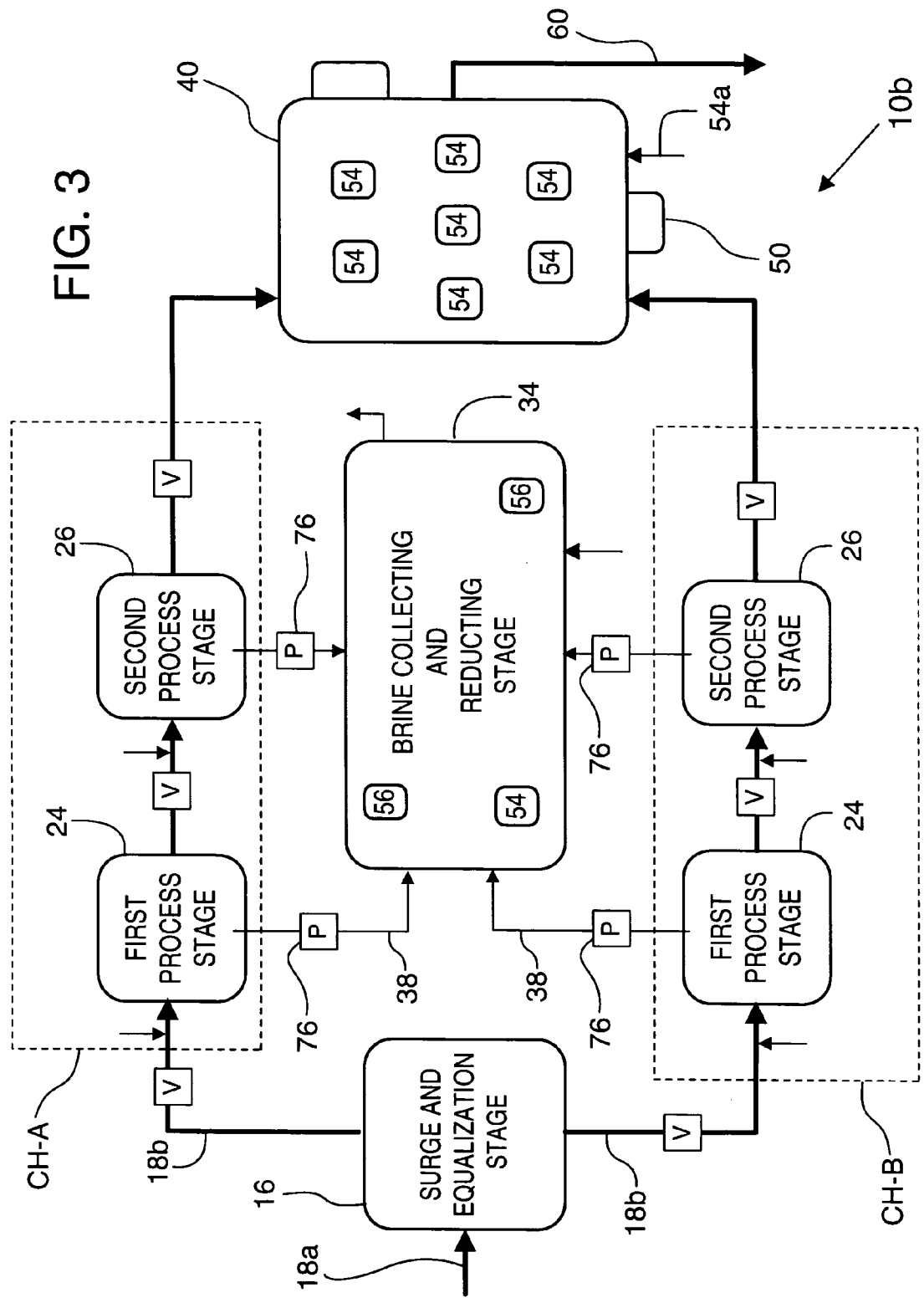
FIG. 3 provides an exemplary embodiment of a water conditioning system of the invention structured for enabling continuous or nearly continuous water conditioning activities to be conducted by way of employing a plurality of conditioning channels.

Referring now to FIG. 3, there is illustrated therein another preferred embodiment of a water conditioning system 10b in accordance with the invention. As shown, a flow 18a of influent water may again be collected and equalized in a surge and equalization stage 16. However, in the case of the embodiment of FIG. 3, two independent conditioning channels are provided: a first channel CH-A and a second channel CH-B. Accordingly, two flows 18b each provide a source flow of influent water for a first process stage 24 of each channel.

As appreciated by skilled individuals, a multi-channel embodiment such as 10b of FIG. 3 may be operated in at least one of two fashions. For very high throughput, over a given interval each channel may be operated at the same time. As such, each channel will be operated in parallel in order to maximize the number of gallons to be conditioned in a selected time interval. When operated in this fashion, a large surge and equalization stage 16 may still be required so that the flows 18b to each channel may be shut off for regeneration, as required.

Alternatively, a multi-channel embodiment can be employed such that water conditioning may be effected substantially by a first channel, such as channel CH-A, while an alternate channel, such as channel CH-B is regenerated and being prepared for future use. When channel CH-A reaches a point where regeneration is necessary, the flow of influent water 18b may be switched to an alternate channel, such as channel CH-B. When operated in this latter fashion continuous conditioning activities may be conducted over a long period of time.

As further indicated in FIG. 3, such a multi-channel, multi-stage conditioning system may be configured with a number of shared resources or components including the surge and equalization stage 16, the brine collecting and reducing stage 34, and the output finishing stage 40. In addition, yet other structures may be shared such as chemical tanks, compressed air sources 54a, etc. However, as understood by skilled persons, an important aspect to be considered when designing multi-channel, multi-stage water conditioning system's that are structured to support continuous or near continuous operation, is the increased capacity required for shared portions or stages, such as the output finishing stage 40 and the brine collecting and reducing pond 34.

Turning now to FIG. 4A, a preferred passive embodiment of a water conditioning system 10a, which is consistent with the embodiment of FIG. 2, is depicted. An important characteristic of the FIG. 4a embodiment is a minimal use of mechanical pumps for effecting a flow of influent water 18 through the water conditioning system 10a. Once the influent water is pumped from a source location, if required, into the surge and equalization stage 16, the flow 18b/18c of influent water into and through the system 10a is effected by gravity, providing for a substantially passive and reduced cost system. Accordingly, as illustrated in FIG. 4a a head differential is preferably provided between each of the surge and equalization stage 16, the first process stage 24, the second process stage 26, etc., and the output finishing stage 40. For example, when considering the influent water flow 18b from the surge and equalization stage 16 to the first process stage 24, it would be desirable to locate the high water line 27 of the first process stage 24 one or more feet below an input to the outlet pipe 17 of the surge and equalization stage 16—resulting in a natural and passive flow 18b from the surge and equalization stage 16 into and through the first process stage 24. Similarly, to support a passive flow from the first process stage 24 into and through the second process stage 26, and from the second process stage 26 into the output finishing stage 40, each of these latter stages would be positioned below the preceding stage, as illustrated in FIG. 4A.

Figure 4B:
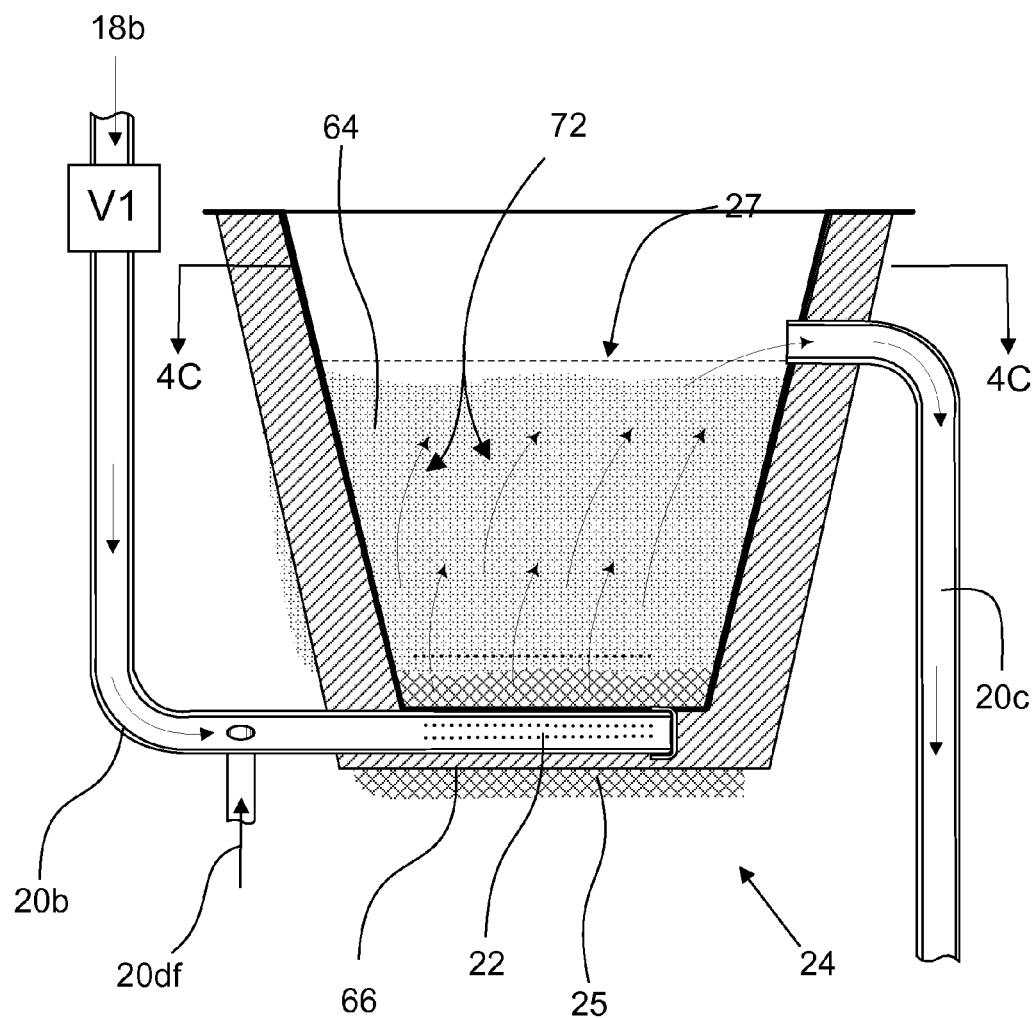
FIG. 4B provides an enlarged cross sectional side view of a first conditioning bed of FIG. 4A, which is structured for holding a load of molecular filtering material such as a Zeolite, clearly illustrating a preferred arrangement of inlet and outlet fluidic couplings structures for causing an up-flow of water flowing through the conditioning bed.

As can be seen in FIG. 4A, and as shown enlarged and somewhat simplified in FIG. 4B, a flow 18b from the surge and equalization stage 16 to the first process stage 24 is supported by fluidic coupling 20b, which preferably includes an in-line valve V1. The flow 18b of influent water enters the first process stage 24 at a lower location near a bottom or bed 25 by way of fluidic coupling 20b, which includes one or more end portions (proximate to the bed 25) having perforations 22. Influent water dispersed by the end portions of 20b having the-perforations 22 will flow upwardly. This is clearly seen in FIG. 4B, and indicated by the flow direction arrows 72. The upwardly flowing influent water flows through the molecular filtering material 64 and contacts the surfaces of the molecular filtering material 64 in the process. Subsequently the upflowing influent water exits the first process stage 24 by way of an upper/first end of fluidic coupling 20c located proximate to a high water line 27.

Figure 4C:
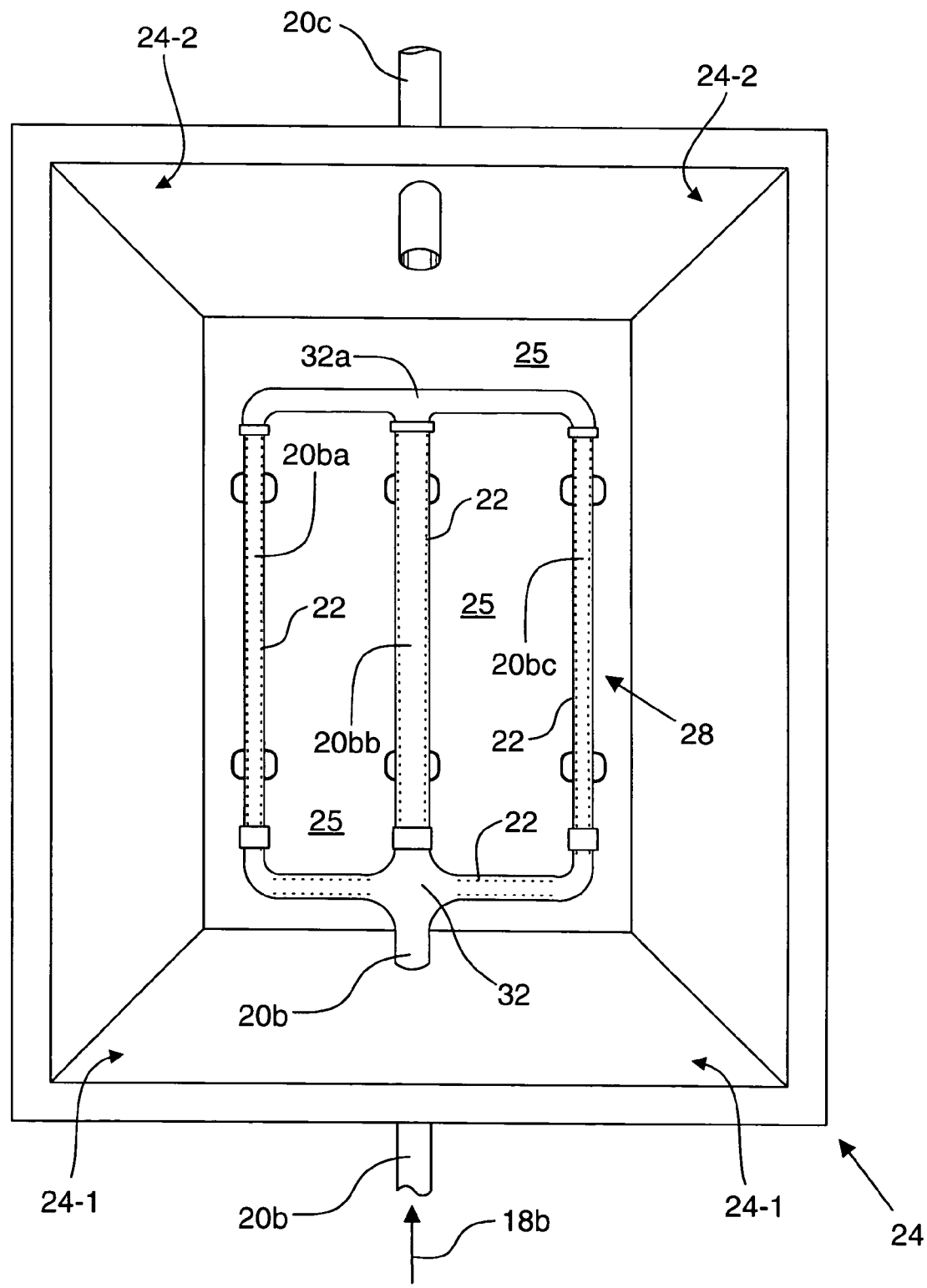
FIG. 4C provides a plan view of an emptied embodiment of a conditioning bed of FIG. 4A or 4B, which is taken in the direction indicted by the arrows of line 4C-4C (FIG. 4B), showing a preferred arrangement including a perforated manifold assembly.

It is important to note that the depictions of FIGS. 4A and 4B are somewhat simplified. For example, as best seen in FIG. 4C, in order to cause an even and uniform upflowing of influent water from a bed 25 of a process stage, such as first process stage 24, through the molecular filtering material 64 thereof, a perforated manifold assembly 28 is most preferably provided. As illustrated in FIG. 4C, the perforated manifold assembly 28 may be structured with an input manifold 32, which is coupled to the fluidic coupling 20b, feeding the flow of influent water 18b into the process stage. The input manifold 32 receives influent water 18b and distributes the influent water to each of a plurality of spaced and perforated fluidic couplings placed proximate to the bed 25 of the process stage 24. For example, as illustrated in FIG. 4C, an even flow may be provided by employing a plurality of spaced and perforated fluidic coupling, such as fluidic coupling 20ba, fluidic coupling 20bb, and fluidic coupling 20bc, which may be terminated by an end cap manifold 32a.

The inclusion of a structure such as the perforated manifold assembly 28 enables influent water the desired up-flow of influent water to be established, which is preferred for maximizing the contacting of influent water with surfaces of the molecular filtering material 64. Once the influent water 18b passes through the molecular filtering material of the process stage, the influent water exits the process stage by way of one or more fluidic couplings 20c, which may feed a manifold assembly similar to that of FIG. 4C of the next process stage.

As appreciated by skilled persons, numerous modifications may be made to the perforated manifold assembly 28. For example, additional perforations may be included, such as perforations 22 provided in input manifold 32. Further, it is contemplated that the perforations proximate to the input side 24-1 may be provided having a larger diameter than the perforations provided proximate to the output side 24-2. Yet other modifications are certainly possible and providable by skilled persons.

Returning to FIG. 4B, as shown therein a most preferred process stage would include a bedding of gravel or rock 66. For example, a bedding of washed 1-inch rock 66 has been employed to fill the bottom of the process stage 24 such that the perforated manifold assembly 28 is covered by the rock. This arrangement allows for a more uniform flow of influent water through the process stage, and additionally prevents molecular filtering material 64 from being sucked out of the process stage during de-watering and flushing activities. Essentially, the use of the rock 66 under the molecular filtering material 64, as depicted, acts as a so called 'French drain' to an included de-watering pump.

It should be understood that modifications may be made to the molecular filtering material 64 such that other cations and or anions may be removed from a flow 18 of influent water flowing through the water conditioning system 10 of the invention. For example, surfactants may be applied to the molecular filtering material 64 of a respective process stage. This causes an altering the electrical charge of the molecular filtering material 64, enabling anions of interest to be removed (adsorbed) from the influent. For example, one preferred surfactant that may be employed with the present invention is HDTMA-bromide or hexadeclytrimethylammonium-bromide. Yet other modifications may certainly be provided by skilled individuals.

Turning now to FIG. 5, a somewhat simplified operational flowchart is illustrated for an embodiment of a method for water conditioning activities in accordance with the present invention. As shown, the method may commence at 100 with influent water flowing into and through a first process stage. The source of the influent water may be provided directly from a source, or more preferably by way of a surge and equalization stage/pond, as discussed hereinabove. Next, at 102 and 104 the influent water being conditioned may flow into and through other included process stages. Each additional process stage will involve the flowing of influent water through a fluidic coupling from an upper output location of first process stage into a lower entry/dispersal location of a second process stage.

At 108, influent water flows into the output finishing stage. If additional conditioning is needed, additional activities and mechanisms may be included to effect such finishing. For example, as shown in FIG. 5, at 112 if the bicarbonate level is to be reduced in the output finishing stage, a chemical drip mechanism may be activated at 114 to, for example, provide an acid drip. In addition, at 116, a decision is made as to whether an included aeration mechanism is possibly selectively activated at 118. After a pre-determined settling, precipitating and or finishing time interval, at 120 the conditioned influent water exits the system and is discharged or stored.

It is important to note that the process embodiment of FIG. 5 may certainly be modified by skilled persons. For example, an additional step or steps may be provided wherein the influent water is collected, say in a surge and equalization stage, or pre-conditioned by including one or more additional process stages before step 100 of FIG. 5. Further, if chemical interactions are of concern, several output finishing stages 108 may be included one after the other. Yet another modification may provide for one or more chemical drips to be feed into a process stage, such as first process stage 24 and second process stage 26 (as discussed hereinabove). For example, a shown in FIG. 4B, the fluidic coupling 20b may include a drip feed tube 20df, which may be coupled to a source of chemicals to be used to further condition the influent water flowing through the associated process stage. Those skilled in the art can provide yet other possible modifications and alterations.

Referring now to FIG. 6, an embodiment of a possible regeneration mechanism 46a is depicted. This embodiment includes pumps P1 and P2, which will enable at least one of the following activities to be realized:

a) draining a substantial volume of influent water of a process stage;
b) circulating a volume of regeneration chemicals, in a closed loop, through a process stage for a predetermined length of time; and
c) pumping a salt brine resulting from the use of the volume of regeneration chemicals during the regeneration of a process stage;
d) filling the process stage being regenerated, at least partially, with a volume of fresh water; and
e) pumping a volume of water employed for rinsing purposes to one of the brine collecting and reducing pond or alternately to the output finishing stage.

TABLE 1

Operational Modes and Pump/Valve Settings

| Available Modes | Pump (s) | Open Valves | Closed Valves |
|---|---|---|---|
| C - Flow thru mode | None | V1, V5, V6 | V1b, V1c, V9, V3, V4 |
| R1 - Influent water drain | P1 | V1b | V1, V1c, V3, V4, V9 |
| R2 - Chemical loading | P2 | V3 | V1, V1b, V1c, V4, V9 |
| R3 - Cycling | P2 | V5, V4 | V1, V1b, V1c, V3, V6, V9 |
| R4 - Salt brine drain | P1 | V1c | V1, V1b, V3, V4, V9 |
| R5 - Fresh water load | P2* | V9 | V1, V1b, V1c, V3, V4 |
| R6 - Rinse water drain | P1 | V1b or V1c | V1, V3, V4, V9 |

As shown in Table 1, each included conditioning bed or process stage can be operated in one of a plurality of modes. For completeness, each of these modes will now be concisely described. The first mode listed is the conditioning (C) mode. This is the normal operating mode employed for conditioning influent water. In the C-mode valves V1, V5, and V6 may be fully or partially opened, while at minimum valves V3, V4, and V9 are closed. The remaining modes listed in Table 1 are modes associated with regeneration activities.

The first regeneration mode R1 is employed for draining a process stage such as first process stage 24 of at least a portion of the influent water present within the process stage. This water is preferably drained into either an output finishing pond, but may alternately be drained to the brine collecting and reducing pond. The actual pond to which the influent water is pumped to may be best determined based on the levels of SAR, SL and EC of the influent water present in the process stage.

The next available regeneration mode R2 provides for a loading of the process stage with chemicals employed for regenerating the load of molecular filtering material of the stage. In this mode a pre-determined volume of chemicals, possibly stored in one or more proximate chemical storage tanks, are loaded into the stage to be regenerated. It may be noted that the regeneration chemicals may be concentrated such that both modes R2 (chemical loading) and R5 (fresh water loading) may be employed for fully loading a process stage with a required regeneration solution. Cycling mode R3 may next be employed for circulating and contacting the load of molecular filtering material with the chemicals, which over a predetermined time interval will produce a heavy salt brine. Next, mode R4 may be employed for draining the salt brine into a collecting and reducing stage, such as the brine collecting and reducing pond 34a of FIG. 2. Once the salt brine has been drained, one or more rinse cycles may be conducted by alternating modes R5, R3, and R6 for one or more iterations.

It is important to note that the arrangement of valves and pumps of FIG. 6, which may be most generally termed a valve and pump module or mechanism, has been constructed using single input and single output valves, such as common gate or ball valves. Accordingly, alternate and possibly preferable embodiments are certainly possible, which may employ multi-port valves. For example, such an alternate embodiment may combine the valves V1b and V1c into a single multi-port valve having one input and two selectable outputs. Similarly, valves V4, V5, and V6 may also be replaced by such a multi-port valve in a variety of differing embodiments of a valve and pump module of the invention. Importantly, any such included module may, at minimum, support the operational modes of Table 1.

As discussed hereinabove, the regeneration chemicals are applied to the molecular filtering material 64 at a time when the molecular filtering material has become saturated with sodium and other cations. As appreciated by skilled persons, the actual chemicals employed may vary with a number of parameters, including the type of molecular filtering material being employed within a respective conditioning stage. A most preferred molecular filtering material is provided as a zeolite material. Several examples, which are listed below in preference order, include:
1. potassium based clinoptilolite;
2. sodium based clinoptilolite; and
3. sodium/calcium chabazite.

It may be noted that the above preferred zeolites are examples of molecular filtering materials well suited for conditioning influent waters having a high sodium content, such as CBM discharge waters. When employing the above listed zeolite materials the most preferred regeneration chemicals include calcium based chemicals, such as calcium oxide (CaO), and magnesium based chemicals, such as magnesium oxide MgO). For example, when employing the preferred potassium based clinoptilolite, carbide lime may be provided in a concentrated solution that may be gravity fed from a chemical storage unit 47 into the conditioning bed 24a to be regenerated (thereby not requiring a pump). As appreciated by skilled persons, other chemicals may be employed for regeneration purposes when specific cations present are hard to exchange with calcium and magnesium. For example, ammonia or potassium based chemicals may be employed first, and subsequently followed by one or more calcium and or magnesium based chemicals to strip and replace the ammonia or potassium cations.

Although the present invention may most preferably be configured for manual operation, wherein one or more operators manually open and close valves, as required, to effect conditioning and regenerating activities in accordance with the present invention, automated embodiments are certainly contemplated. For example, as shown in FIGS. 7A and 7B regeneration and finishing activities may be automated employing controller based modules. Turning first to FIG. 7A, an embodiment of an automated regeneration mechanism is illustrated. Included is a controller 80 which is configured for controlling the operation of the regeneration system, most preferably with or without operator intervention. The controller 80 is operatively coupled, by way of required interface circuitry 84, to a saturation detection module 136, a valve and pump module 90, and possibly chemical storage unit 47. For example, as shown in FIG. 7A, operative coupling 130a may be employed for operatively coupling the saturation detection module 136 to the interface circuitry 84 and the controller 80. Similarly, operative coupling 90a may be included for operatively coupling the valve and pump module 90 to the interface circuitry 84 and the controller 80.

One possible operating arrangement or sequence may call for the controller 80 to periodically determine, by way of the saturation detection module 136, when the level-of cations, as well as other possible levels of concern, of the influent water exiting the process stage reaches an upper limit (indicating a need for regeneration). That is, if it is determined that the load of molecular filtering material of the stage has become saturated, for example with sodium, soluble salts, and or other cations, the controller 80 may activate one or more electrically controlled valves of the valve and pump module 90, such as discussed hereinabove, and possibly one or more pumps, to effect a regenerating of the load of molecular filtering material of the process stage. Accordingly, the chemical storage unit 47 of FIG. 7A is coupled to the valve and pump module 90 such that the controller 80 may activate one or more valves causing a preferably gravity fed flowing of regeneration chemicals from the chemical storage unit 47 by way of fluidic couplings, including fluidic couplings 134 and 130, into a process stage such as the process stage 24. Importantly, the available operational modes of Table 1 may be conducted in a pre-determined automated fashion resulting in the regeneration of the molecular filtering material of the process stage 24 without human intervention.

Referring now to FIG. 7B, a block diagram of an embodiment of an automated mechanism employable with an output finishing stage of the invention is illustrated. Again, the controller 80 and interface circuitry 84 are included and provide a similar control function as described when referring to the control means of FIG. 7A. Operatively coupled to the controller 80 is a detection module 94 which is included for determining the levels of items such as bicarbonates, calcium, magnesium, etc. If it is determined that a level is too high or too low, one or more valves may be activated to commence a drip or suitable flow of one or more chemicals into the output finishing stage. In addition, an aeration mechanism 54 and or a dispersion mechanism 58 may be selectively activated, as required, say in an on-off fashion.

As skilled persons will appreciate the automated modules of FIGS. 7A and 7B are but one of numerous embodiments providable by skilled persons. It is certainly contemplated that additional systems including additional control capabilities may be utilized with the embodiments of the present invention.

In addition, so as to not obfuscate the fundamental features and characteristics of the present invention, the depicted fluidic coupling and valving arrangements provided in the included figures have been somewhat simplified. For example, as shown in FIG. 6 the de-watering pump P1 is coupled to the perforated manifold assembly 28, from which the process stage may be drained. A possibly more preferable configuration may include one or more standpipes oriented vertically which extend down to the bed region into the bedding of rock 66. With such a configuration, one or more submersible pumps assemblies may be most preferably employed. Alternately, as depicted in FIG. 7A, a standpipe 132 may be provided that is coupled to a self-priming valve and pump assembly 90.

Accordingly, while there have been described herein a plurality of the currently preferred embodiments of the present invention, along with contemplated methods of operation and use, those skilled in the art will recognize that other and further modifications may be made without departing from the invention. As such, the foregoing descriptions of the specific embodiments of the present invention have been presented for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A method for conditioning a volume of influent water resulting from coal bed methane drilling activities, with the conditioning employed to reduce the electrical conductance of the influent water by reducing levels of sodium cations and bicarbonates present in the influent water, with the method comprising the steps of:
   a) preparing and chemically modifying a load of molecular filtering material for use in a process stage for conditioning influent water passing through the process stage by way of an ion exchange process;
   b) collecting influent water and employing a gravity feed arrangement for causing a flowing of the influent water through the process stage, wherein the influent water enters at a lower location proximate to a bottom of the process stage, thereby causing the influent water to flow upwardly through the load of molecular filtering material, while exiting the process stage at a location that is proximate to a high water line and elevated with respect to the lower location proximate to the bottom at which the influent water first entered the process stage;
   c) with the flowing of the influent water through the process stage effecting a contacting with surfaces of the load of molecular filtering material and causing a cation exchange process wherein sodium cations are exchanged while calcium cations and bicarbonates are released;
   d) further employing the gravity feed arrangement for causing a flowing of partially conditioned influent water from the process stage into an output finishing stage, for additional conditioning wherein the calcium cations now present in the influent water react with bicarbonates, causing a precipitating of the bicarbonates as the partially conditioned influent water passes through the output finishing stage, prior to exiting from the output finishing stage;
   e) with the conditioning of the volume of influent water resulting from coal bed methane drilling activities, wherein the gravity feed arrangement is employed for causing a flowing and conditioning of the influent water for reducing the electrical conductance by reducing levels of sodium cations and bicarbonates present in discharged output water.

2. The conditioning method as recited in claim 1 further including an additional regeneration step, employed for regenerating the load of molecular filtering material of the process stage when it has been determined that the load of molecular filtering material is saturated with sodium cations removed during an initial conditioning of the influent water flowing through the process stage.

3. The conditioning method as recited in claim 2, wherein the additional regeneration step includes:
   a) suspending the flow of influent water entering a process stage to be regenerated;
   b) causing a volume of regeneration chemicals to contact the load of molecular filtering material of the process stage for a pre-determined time interval until the load of molecular filtering material has been regenerated;
   c) pumping a salt brine produced by the regenerating step from the process stage;
   d) rinsing the load of molecular filtering material of the process stage with fresh water;
   e) re-establishing the flow of influent water through the regenerated molecular filtering material of the process stage, thereby resuming the conditioning of influent water.

4. The conditioning method as recited in claim 3, wherein the step of pumping the salt brine results in a transferring of the salt brine to a holding vessel for collecting and reducing.

5. The conditioning method as recited in claim 1, wherein molecular filtering material of the process stage is provided by a natural zeolite in the form of clinoptilolite.

6. A method for conditioning a volume of influent water resulting from coal bed methane drilling activities, with the conditioning of the volume of influent water resulting in a reducing of electrical conductance of the influent water by reducing levels of sodium cations and bicarbonates present in the influent water, with the method comprising the steps of:
   a) preparing and chemically modifying at least one load of molecular filtering material for use in at least one process stage for conditioning influent water passing through each process stage;
   b) employing a gravity feed arrangement for causing a flowing of influent water through each included process stage wherein the influent water contacts surfaces of the load of molecular filtering material causing a cation exchange process wherein sodium cations are adsorbed while calcium cations are released;
   c) coupling a flow of partially conditioned influent water exiting at least one process stage into an output finishing stage for additional conditioning wherein the calcium cations added to the influent water when passing through the process stage react with bicarbonates present in the water that were released during the cation exchange process of the earlier process stage, causing a precipitating of calcium bicarbonate;

d) thereby providing a conditioning method wherein by-products of an initial first stage conditioning, including calcium cations and bicarbonates, which flow into the output finishing stage causing a precipitating of calcium bicarbonate, which in turn lowers the electrical conductance of the coal bed methane influent waters, enabling the resulting output water flowing from the output finishing stage to be directly discharged into the environment.

7. The method for conditioning a volume of influent water as recited in claim 6, wherein the flowing of influent water through the process stage and output finishing stage is caused by a passive gravity feed arrangement, not employing mechanical pumps during conditioning activities, wherein a source providing influent water to the process stage is elevated with respect to the process stage, while the process stage is itself elevated with respect to the output finishing stage, thereby establishing the gravity feed arrangement.

8. The method for conditioning a volume of influent water as recited in claim 7, wherein the influent water entering the process stage enters at a lower location proximate to a bottom of the process stage, while exiting the process stage at a location that is proximate to a high water line and elevated with respect to the lower location at which the influent water first entered the process stage, thereby causing the influent water to flow upwardly through the load of molecular filtering material, even while the flow through the process stage is resulting from the employed gravity feed arrangement, causing a slowed contacting of the surfaces of the load of molecular filtering material.

9. The method for conditioning a volume of influent water as recited in claim 8, wherein each of the process stage and output finishing stage is provided by an earthen pond having a plastic liner.

10. The method for conditioning a volume of influent water as recited in with claim 7, wherein when it is determined that a further reducing of bicarbonates present in the water flowing into the output finishing stage is required, the level of bicarbonates can be further reduced, by way of precipitation, by applying to the influent water entering the output finishing stage, in a pre-determined fashion, a volume of a selected acid.

11. The method for conditioning a volume of influent water as recited in claim 6, wherein the load of molecular filtering material of the process stage is provided by a natural zeolite in the form of clinoptilolite.

* * * * *